(12) United States Patent
Rosengren et al.

(10) Patent No.: US 8,701,513 B2
(45) Date of Patent: Apr. 22, 2014

(54) SCREW DRIVEN LINEAR ACTUATOR AND HOUSING ASSEMBLY

(75) Inventors: Gary Rosengren, Brooklyn Park, MN (US); Ryan H. Bourgoine, Buffalo, MN (US)

(73) Assignee: Tol-O-Matic, Inc.

( * ) Notice: Subject to any disclaimer, the term of this patent is extended or adjusted under 35 U.S.C. 154(b) by 393 days.

(21) Appl. No.: 12/836,231

(22) Filed: Jul. 14, 2010

(65) Prior Publication Data
US 2012/0011949 A1    Jan. 19, 2012

(51) Int. Cl.
*F16H 57/02* (2012.01)
*F16H 25/20* (2006.01)

(52) U.S. Cl.
USPC ....... 74/89.23; 74/421 A; 74/606 R; 165/185; 310/52

(58) Field of Classification Search
USPC ........... 74/89.23, 421 A, 606 R; 165/79, 185; 310/12.29, 52
See application file for complete search history.

(56) References Cited

U.S. PATENT DOCUMENTS

| | | | |
|---|---|---|---|
| 3,815,435 A | | 6/1974 | Eschenbacher et al. |
| 3,851,541 A | | 12/1974 | Ploss et al. |
| 3,969,807 A | | 7/1976 | Takizawa et al. |
| 4,000,664 A | * | 1/1977 | Christensen ................ 74/89.44 |
| 4,040,445 A | | 8/1977 | McCormick |
| 4,072,063 A | | 2/1978 | Nauman |
| 4,137,784 A | * | 2/1979 | Griffin ......................... 74/89.37 |
| 4,191,240 A | * | 3/1980 | Rule et al. ...................... 165/79 |
| 4,198,872 A | | 4/1980 | Metz |
| 4,250,762 A | | 2/1981 | Weatherby |
| 4,266,437 A | | 5/1981 | Obergfell |
| 4,286,793 A | | 9/1981 | Ploss et al. |
| 4,369,011 A | | 1/1983 | Ploss |
| 4,393,319 A | | 7/1983 | Bock |
| 4,438,662 A | | 3/1984 | Walton et al. |
| 4,489,248 A | | 12/1984 | Petersen |
| 4,496,865 A | | 1/1985 | Allen et al. |
| 4,521,707 A | | 6/1985 | Baker |
| 4,614,128 A | | 9/1986 | Fickler |
| 4,643,710 A | | 2/1987 | Troutner |
| 4,664,136 A | | 5/1987 | Everett |
| 4,860,638 A | | 8/1989 | Hosono et al. |
| 4,987,822 A | | 1/1991 | Stoll |
| 5,053,685 A | | 10/1991 | Bacchi |
| 5,087,845 A | | 2/1992 | Behrens et al. |
| 5,099,161 A | | 3/1992 | Wolfbauer, III |
| 5,121,042 A | | 6/1992 | Ako |
| 5,130,585 A | | 7/1992 | Iwamatsu et al. |
| 5,142,172 A | | 8/1992 | Horikoshi et al. |
| 5,234,386 A | | 8/1993 | Nagai et al. |
| 5,334,897 A | | 8/1994 | Ineson et al. |
| 5,363,741 A | | 11/1994 | Takada et al. |
| 5,445,045 A | | 8/1995 | Nagai et al. |
| 5,491,372 A | | 2/1996 | Erhart |
| 5,499,547 A | | 3/1996 | Nagai et al. |

(Continued)

*Primary Examiner* — William C Joyce
(74) *Attorney, Agent, or Firm* — Dorsey & Whitney LLP

(57) ABSTRACT

A linear actuator and housing assembly may be used to increase motor performance and dissipate excess thermal energy. One embodiment relates to an actuator housing and an electric motor coupled to the actuator housing, where the electric motor is disposed within the actuator housing such that there is a close proximity between the actuator housing and the motor. A linear actuator assembly may be operably coupled to the electric motor, where the linear actuator assembly is disposed within the actuator housing and a thermally conductive material is disposed between the actuator housing and motor.

18 Claims, 4 Drawing Sheets

(56) References Cited

U.S. PATENT DOCUMENTS

| | | |
|---|---|---|
| 5,557,154 A | 9/1996 | Erhart |
| 5,606,902 A | 3/1997 | Hosono et al. |
| 5,614,778 A | 3/1997 | Terao et al. |
| 5,617,772 A | 4/1997 | Hosono et al. |
| 5,637,940 A | 6/1997 | Nagai et al. |
| 5,676,016 A | 10/1997 | Nagai et al. |
| 5,685,390 A | 11/1997 | Chikuma et al. |
| 5,689,994 A | 11/1997 | Nagai et al. |
| 5,747,896 A | 5/1998 | Nagai et al. |
| 5,761,960 A | 6/1998 | Nagai et al. |
| 5,784,922 A | 7/1998 | Ozaki et al. |
| 5,796,187 A | 8/1998 | Nagai et al. |
| 5,799,543 A | 9/1998 | Nagai et al. |
| 5,809,831 A | 9/1998 | Nagai et al. |
| 5,884,549 A | 3/1999 | Hosono et al. |
| 5,912,520 A | 6/1999 | Kobayashi et al. |
| 5,966,988 A | 10/1999 | Aiso et al. |
| 6,000,292 A | 12/1999 | Nagai et al. |
| 6,003,428 A | 12/1999 | Mundie et al. |
| 6,067,868 A | 5/2000 | Nakamura et al. |
| 6,081,051 A | 6/2000 | Kitazawa et al. |
| 6,136,758 A * | 10/2000 | Yamada et al. ............... 508/172 |
| 6,145,395 A | 11/2000 | Swanson et al. |
| 6,177,743 B1 | 1/2001 | Hartramph et al. |
| 6,186,770 B1 | 2/2001 | Ziv-Av |
| 6,223,971 B1 | 5/2001 | Sato |
| 6,278,077 B1 | 8/2001 | Cecil |
| 6,357,100 B2 | 3/2002 | Speller et al. |
| 6,362,547 B1 | 3/2002 | Peterson et al. |
| 6,531,798 B1 | 3/2003 | Palmero |
| 6,603,228 B1 | 8/2003 | Sato |
| 6,718,837 B2 | 4/2004 | Sato et al. |
| 6,756,707 B2 | 6/2004 | Hochhalter |
| 7,541,707 B2 | 6/2009 | Hochhalter et al. |
| 2004/0120615 A1 | 6/2004 | Chase |
| 2008/0289442 A1* | 11/2008 | Kawada et al. ............ 74/473.12 |
| 2009/0255354 A1* | 10/2009 | Akkermann ................ 74/89.33 |
| 2009/0260464 A1* | 10/2009 | Holker et al. .............. 74/89.33 |
| 2011/0133582 A1* | 6/2011 | Bingler ........................... 310/71 |

* cited by examiner

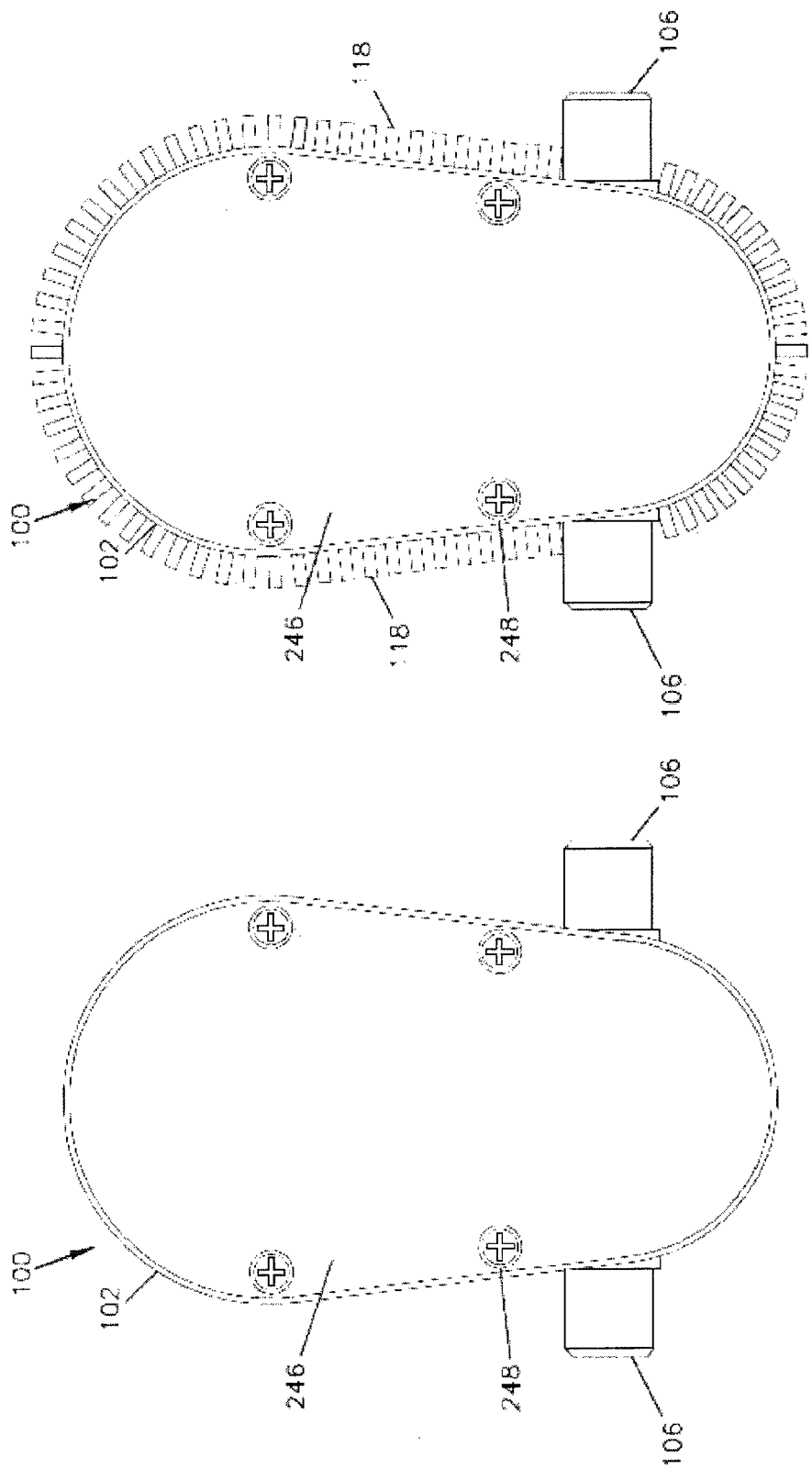

SCREW DRIVEN LINEAR ACTUATOR AND HOUSING ASSEMBLY

FIELD OF THE INVENTION

The present disclosure relates to a screw driven linear actuator and housing assembly. More particularly, the present disclosure relates to a linear actuator assembly and housing for the linear actuator driven by a servo motor. The present disclosure has particular use to applications requiring a compact package size with a high performance servo motor, and applications requiring highly efficient heat dissipation, among others.

BACKGROUND OF THE INVENTION

Controlling movement of automated fixtures can be done using linear movement of the type that is produced by linear actuators. Linear actuators can be driven by various mechanisms, including electric, pneumatic or hydraulic actuators. Linear actuators work by extending and retracting a thrust member, sometimes with a work piece affixed to its end to perform certain tasks A subset of linear actuators, electric ball screw-driven actuators typically include a thrust rod assembly, a screw shaft, a nut, and a work piece connection end, and may further include a housing for the motor and actuator assembly. Within the housing, a motor shaft can be configured to drive the screw shaft. The screw shaft engages the nut coupled with the thrust rod assembly, which transfers rotary motion of the screw shaft into linear motion of the thrust rod assembly. The work piece connection end may support a variety of useful connections depending on the use of the particular actuator. Linear actuators may thus be applied in a variety of uses, such as automated assembly line work to powering animatronics.

A actuators developed for particular applications may have certain strict performance and design requirements. These requirements may include size constraints, operating temperature requirements, or motor performance minimums, among others. Some combinations of these requirements may be desired for a particular actuator assembly. Different requirements may conflict with one another, such as the need for a small total assembly size while also maintaining high performance actuation from a high performance motor. Because electric motors, such as those used to drive actuators, typically have heat output commensurate with their performance, high performance motors in small packages may also have large heat output. As such, operating temperature requirements must be considered as well.

An electric motor normally has a maximum operating temperature limit. Typically, in order to avoid damage to the motor, the motor must be operated within its temperature limit. The operating temperature directly relates to a given amount of current going through the motor, which in turn directly translates to motor output torque. When driving a linear actuator, the motor output torque is converted to a given amount of actuator thrust as the torque is translated through the ball screw and to the work piece of the actuator. As a result of this relationship, the maximum actuator thrust in an actuator assembly is limited by the temperature limit of the motor being used. This can especially be a problem for applications requiring both a high degree of performance in a very small package size, which may hinder heat dissipation. Because when larger servo motors are required to create the same amount of torque as a smaller motor, a larger servo motor will run cooler because it has less resistance, which equates to less power losses.

Thus, there exists a need in the art for a compact screw-driven linear actuator assembly and housing with high performance and torque, combined with improved heat dissipation qualities.

BRIEF SUMMARY OF THE INVENTION

The present disclosure, in one embodiment, relates to a linear actuator and housing assembly that may be used to increase motor performance and dissipate excess thermal energy. According to the present disclosure, one embodiment relates to an actuator housing and an electric motor coupled to the actuator housing, wherein the electric motor is disposed within the actuator housing such that there is a close proximity between the actuator housing and the motor. The invention further includes a linear actuator assembly operably coupled to the electric motor, wherein the linear actuator assembly is disposed within the actuator housing. A thermally conductive material is disposed between said actuator housing and said motor.

The present disclosure, in another embodiment, relates a linear actuator and housing assembly. The assembly includes a metallic housing coupled to an electric motor and a linear actuator. The electric motor is operably coupled to the linear actuator, and a thermally resistive material is disposed between the metallic housing and the electric motor.

The present disclosure, in another embodiment, relates to a method for dissipating heat in an electric motor powered linear actuator. The method includes coupling the electric motor and an actuator assembly to a metallic housing, inserting a thermally conductive material between the housing and the electric motor, and conducting the heat produced by the electric motor away from the electric motor into the metallic housing.

While multiple embodiments are disclosed, still other embodiments of the present disclosure will become apparent to those skilled in the art from the following detailed description, which shows and describes illustrative embodiments of the disclosure. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the embodiments will be better understood from the following description taken in conjunction with the accompanying Figures, in which:

FIG. 4A illustrates a rear view of the actuator and housing assembly according to an embodiment of the present invention FIG. 4B illustrates a rear view of the actuator and housing assembly according to another embodiment of the present invention.

DETAILED DESCRIPTION

Certain details are set forth below to provide a sufficient understanding of embodiments of the invention. However, it will be clear to one skilled in the art that embodiments of the invention may be practiced without these particular details. Moreover, the particular embodiments of the present invention described herein are provided by way of example and should not be used to limit the scope of the invention to these particular embodiments.

Figure 1:
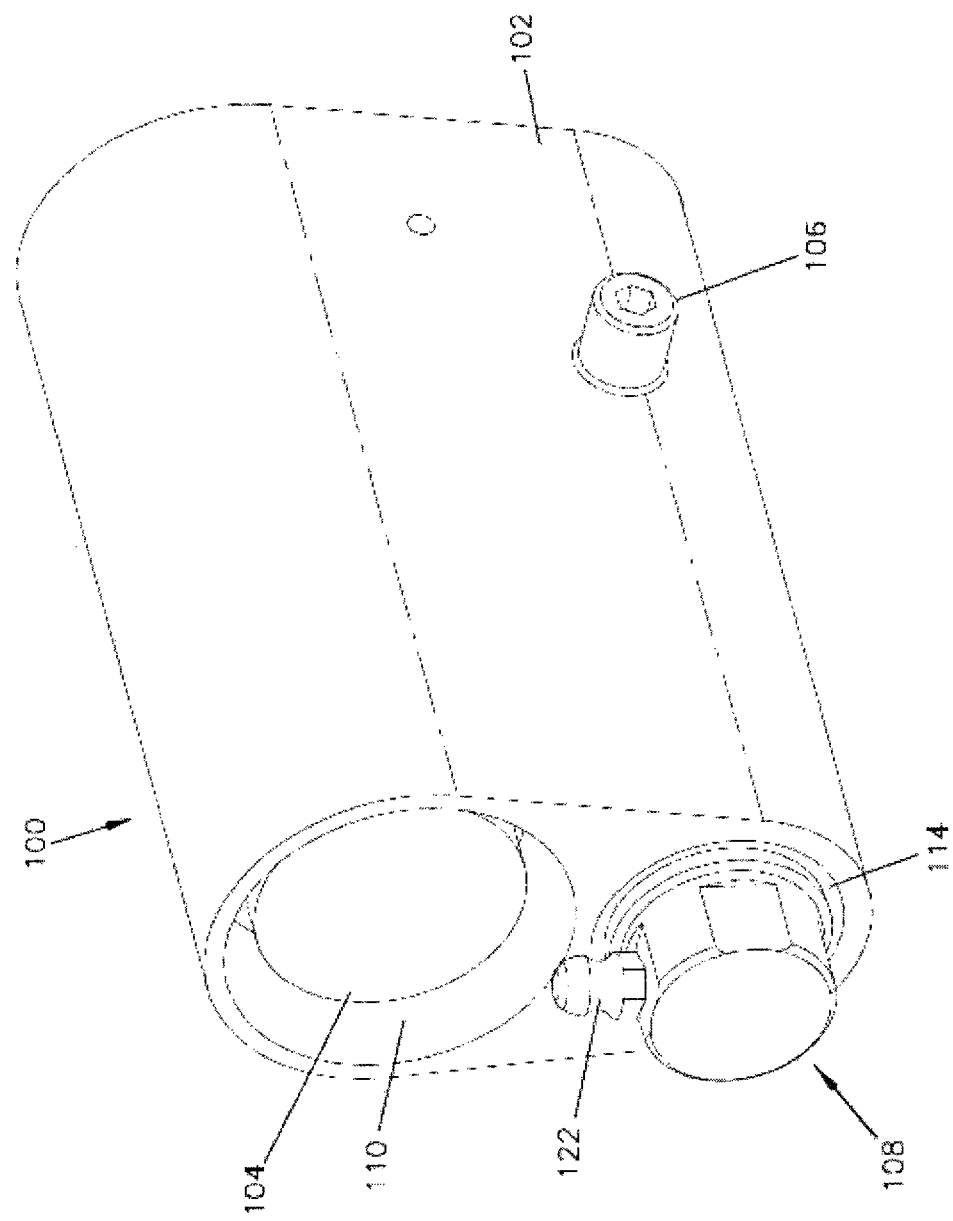
FIG. 1 is a perspective view of a ball screw-driven linear actuator and housing assembly according to one embodiment of the present disclosure.

FIG. 1 illustrates a perspective view of an actuator and housing assembly 100 according to one embodiment of the invention. As shown in FIG. 1, the actuator and housing assembly 100 may include an actuator using any current screw technology, such as a ball, roller, or lead screw type linear actuator. The actuator and housing assembly 100 may generally include an actuator housing 102, a servo motor 104, a pair of actuator trunnions 106 (only one is visible in the FIG. 1), and an actuator assembly 108. In certain embodiments, the actuator and housing assembly 100 may substitute a front face mount or a clevis fastener in place of trunnions 106. Servo motor 104 may be coupled to and secured inside actuator housing 102 at motor recess 110 via servo motor screws 112. The securing motor screws 112 may be external or internal relative to actuator housing 102 as appropriate. Other securing means for servo motor 104 are also possible, including using securing means at the junction of the servo motor 104 with the actuator interface. Actuator assembly 108 may be disposed within actuator housing 102 at actuator recess 114, and may be secured to actuator housing 102 by beveled snap ring 115. In one embodiment, actuator housing 102 may be comprised of aluminum, or a material with thermal resistance properties. Other suitable actuator housing 102 materials may include lighter metals with thermal conductive properties. Both the actuator assembly 108 and servo motor 104 may be disposed within actuator housing 102 such that they are in close proximity to each other. This positioning facilitates transfers of heat from actuator assembly 108 and servo motor 104 to actuator housing 102.

Servo motor 104, which may be operably coupled to actuator assembly 108, is powered by a current source 116. In some embodiments, this current source 116 may be a current source external to housing 102. As current source 116 applies electrical current to servo motor 104, motor 104 rotates and thereby transfers its torque to linear actuator assembly 108. Actuator assembly 108 then translates this motor torque into actuator thrust as actuator assembly 108 moves linearly relative to the actuator housing 102. This activity is shown in further detail in FIGS. 2 and 3.

During operation, both servo motor 104 and actuator assembly 108 produce heat commensurate with the current being applied to the servo motor 104 and the mechanical friction in the actuator assembly 108. As the current is increased to the servo motor 104, the servo motor 104 produces higher torque and thus higher actuator thrust from actuator assembly 108. Both the increased current and the resulting increased activity of motor 104 and mechanical friction from the actuator assembly 108 produces increased heat. In some embodiments of the present invention, heat may be produced from the higher electrical current administered to servo motor 104, because of $i^2 *R$ power losses in the servo motor 104. Power losses may be measured by $i^2 *R$, where i is current and R is electrical resistance. An increase in actuator and housing assembly 100 temperature may also be created by the increased friction created by each moving part within actuator assembly and housing assembly 100.

However, with increased heat being produced by motor 104 and actuator assembly 108, the actuator and housing assembly 100 approaches the safe manufacturer-stated operating temperature for servo motor 104. Significantly exceeding the manufacturer-stated safe operating temperature for motor 104 may cause damage to the motor 104 itself. Moreover, in some embodiments, other components within the actuator and housing assembly 100 may also be vulnerable to very high heat levels, which could leave failure of the device.

In order to account for the increased heat produced by high levels of current running through a high torque/high performance servo motor 104 driving a ball screw actuator assembly 108, according to one embodiment of the present invention, actuator housing 102 may be designed to function as a heat sink. By remaining in close proximity to the heat-producing elements of actuator and housing assembly 100, aluminum actuator housing 102 conducts heat away from heat-producing elements of the actuator and housing assembly 100, and dissipates that heat along its extended surfaces. Thermal energy from servo motor 104, actuator assembly 108, and any other heat-producing parts within actuator and housing assembly 100 may be dissipated in this fashion.

In one embodiment of the present invention, heat transfer from heat-producing elements such as servo motor 104 may be accomplished through a tight fit between the servo motor 104 and housing 102. Optionally, a looser fit may also permit heat transfer between these parts and actuator housing 102. The close proximity of the actuator housing 102 to heat producing elements such as servo motor 104 and actuator assembly 108 facilitates the thermal conduction of heat energy away from these elements and to the housing 102. Once heat is drawn into housing 102, it is dissipated in to the ambient air through the outer surfaces of the actuator housing 102. This may further be aided by exposing actuator assembly 108 to another similar cooling fluid medium. Heat conduction away from actuator housing 102 may further be increased by exposing the outer surfaces of housing 102 to moving air, which aides in heat transfer to the environment. The addition of a fan used to direct air flow along the extended surfaces of actuator housing 102 may provide this effect.

In one embodiment of the present invention, heat is dissipated along smooth surface walls of actuator housing 102. The outer surface area of the actuator housing 102 relative to the servo motor 104 and actuator assembly 108 enables efficient heat dissipation. Alternatively, in a further embodiment of the present invention, the actuator housing 102 may also comprise heat dissipation fins 118 in order to aid in heat dissipation. Heat sink fins 118 (or similar arrangements, such as pins) further increase the surface area of actuator housing 102, and thus increase the surface area along which heat may be dissipated into the environment.

In yet another embodiment of the present invention, conduction of heat away from the heat-producing elements of actuator and housing assembly 102 may be aided with a thermal interface material. Because most thermal interface materials are a better medium for heat transfer than air, certain embodiments of the invention may include thermal interface materials such as a layer of a thermal grease 120 (or thermal paste) between the heat producing elements of the actuator assembly and the actuator housing 102. Thermal grease 120 may be applied between the servo motor 104 and housing 102 to create a generally uniform layer of thermal grease 120, such that substantially no air is present between any surface of the heat producing elements of the actuator and housing assembly 100. Through this configuration, thermal grease 120 maximizes the contact between the heat producing elements within actuator and housing assembly 100 and the actuator housing 102.

Thermal grease 120 typically has a very high thermal conductivity. For example, grease 120 far exceeds the thermal conductivity of air, and may thus transfer heat out of the actuator and housing assembly 100 much more easily. Thermal grease 120 also facilitates contact between rough surfaces, or other surfaces that keep poor contact between heat producing elements and the actuator housing 120. Grease 120 may be applied to the external walls of motor 104 before insertion of the motor 104 into motor recess 110. Alternatively, grease 120 may be injected into the motor recess area after the motor 104 has been inserted. Heat that is produced inside the assembly during operation of the servo motor 104 and actuator assembly 108, as well as heat produce by friction between other moving parts, may be transferred directly to the highly thermally conductive grease 120, and then to the actuator housing 102 for dissipation into the environment.

Figure 2:
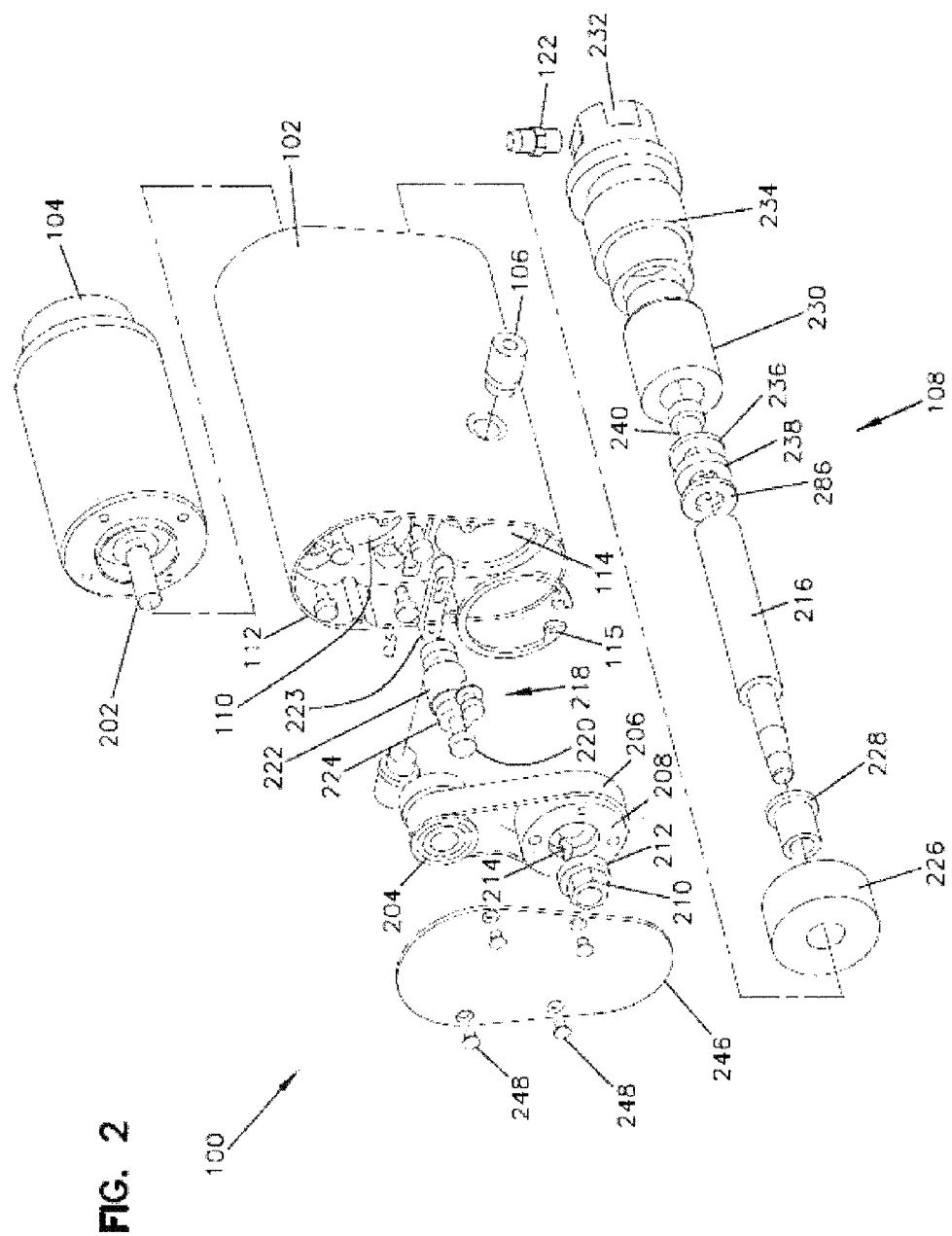
FIG. 2 is an exploded view of the ball screw-driven actuator and housing assembly of FIG. 1.

FIG. 2 is an exploded view of the ball screw-driven actuator and housing assembly 100 according to an embodiment of the present invention. This view provides the details of the motor 104 interface with actuator housing 102, as well as the detail on the power transfer from motor 104 to actuator assembly 108. In one embodiment of the present invention, servo motor 104 is inserted into the distal end of actuator housing 102 at motor recess 110. Motor 104 may form a tight fit with the motor recess 110 so as to facilitate heat transfer and dissipation, as well as to maintain a compact package size of the entire assembly. Motor 104 may be secured to the actuator housing 102 via screws 112. Thermal grease 120 may be applied in a layer between the motor 104 and actuator housing 102 to further facilitate thermal energy transfer to the housing.

The drive shaft 202 of motor 104 may be operably coupled to drive pulley 204. In some embodiments this may be a simple interference fit, or optionally, the two pieces may be secured via screws or other coupling mechanism. In operation, as drive shaft 202 rotates, it rotates drive pulley 204, which is operably coupled to a drive belt 206 as well as an actuator screw pulley 208. Drive pulley 204 then rotates to power the drive belt 206, which simultaneously rotates actuator screw shaft pulley 208 as a result. In some embodiments, actuator screw pulley 208 is secured to actuator assembly 108 via a securing nut 210 and a washer 212. A key 214 on the inner diameter of screw shaft pulley 208 further translates its rotational force to actuator screw shaft 216 by preventing slippage between the screw shaft 216 and the screw shaft pulley 208. This key 214, in combination with the securing nut 210, may further ensure simultaneous rotation of the screw shaft pulley 208 and screw shaft 216.

In some embodiments of the invention, in order to increase transfer of energy from drive shaft 202 of motor 104 to actuator assembly 108, the drive belt 206 may be tensioned against actuator screw shaft pulley 208 through use of a drive belt tensioner 218. Drive belt tensioner 218 increases the contact between drive belt 206 and screw shaft pulley 208 by altering the shape of the drive belt 206 to account for any slack. The drive belt tensioner 218 may comprise a drive shaft shoulder 220 and a sleeve 222, and may be secured with screws to actuator housing 102 and tensioner bracket 223. Drive belt tensioner 218 may further by supported by two bearings 224, which may be disposed in front of and behind sleeve 222. Bearings 224 and sleeve 222 permit tensioner 218 to freely rotate with the movement of the drive belt in such a way that the tensioner 218 still applies pressure to drive belt 206, and indirectly to screw shaft pulley 208, while continuing to freely spin.

According to another embodiment of the invention, actuator assembly 108 is disposed within actuator housing 102 at actuator recess 114. This arrangement may further promote heat dissipation. Actuator assembly 108, which is secured to screw shaft pulley 208 by securing nut 210 and washer 212 at screw shaft 216, is supported at the proximal end by double row angular contact bearing 226. In certain embodiments, screw shaft 216 may interface with bearing 226 through screw shaft sleeve 228, which may be secured to screw shaft 216 through a simple interference fit, as well as with the additional tension provided by securing nut 210.

At its distal end, screw shaft 216 engages an actuator nut 230, which may also be operably coupled to thrust rod 232. In some embodiments, thrust rod 232 may be supported by a bearing 234. In operation, as screw shaft 216 rotates and engages actuator nut 230, thrust rod 232 is pushed away from or pulled towards the screw shaft 216. To reduce impact between the distal portion screw shaft 216 and thrust rod 232, screw shaft 216 may engage a bumper pad 238 at its distal end, which may be sandwiched by two strike plates 236. In another embodiment, a separation shoulder piece 240 may further provide spacing between the screw shaft and the thrust rod 232. At the termination of the thrust rod 232, some embodiments may include zerk fitting 122 to supply lubrication to the actuator assembly 108. Optionally, some embodiments may further include a wiper 242 placed circumferentially around thrust rod 232 and externally affixed to actuator housing 102. The termination of thrust rod 232 may also be affixed with a work piece to perform the desired actuation task, as it is the portion of the actuator assembly 108 that actually extends from and retracts into actuator housing 102 The actuator assembly 108 may be secured within housing 102 by beveled snap ring 115, and enclosed within actuator housing 102 with rear housing cover 246. Rear housing cover 246 may be secured to housing 102 with screws 248.

Figure 3:
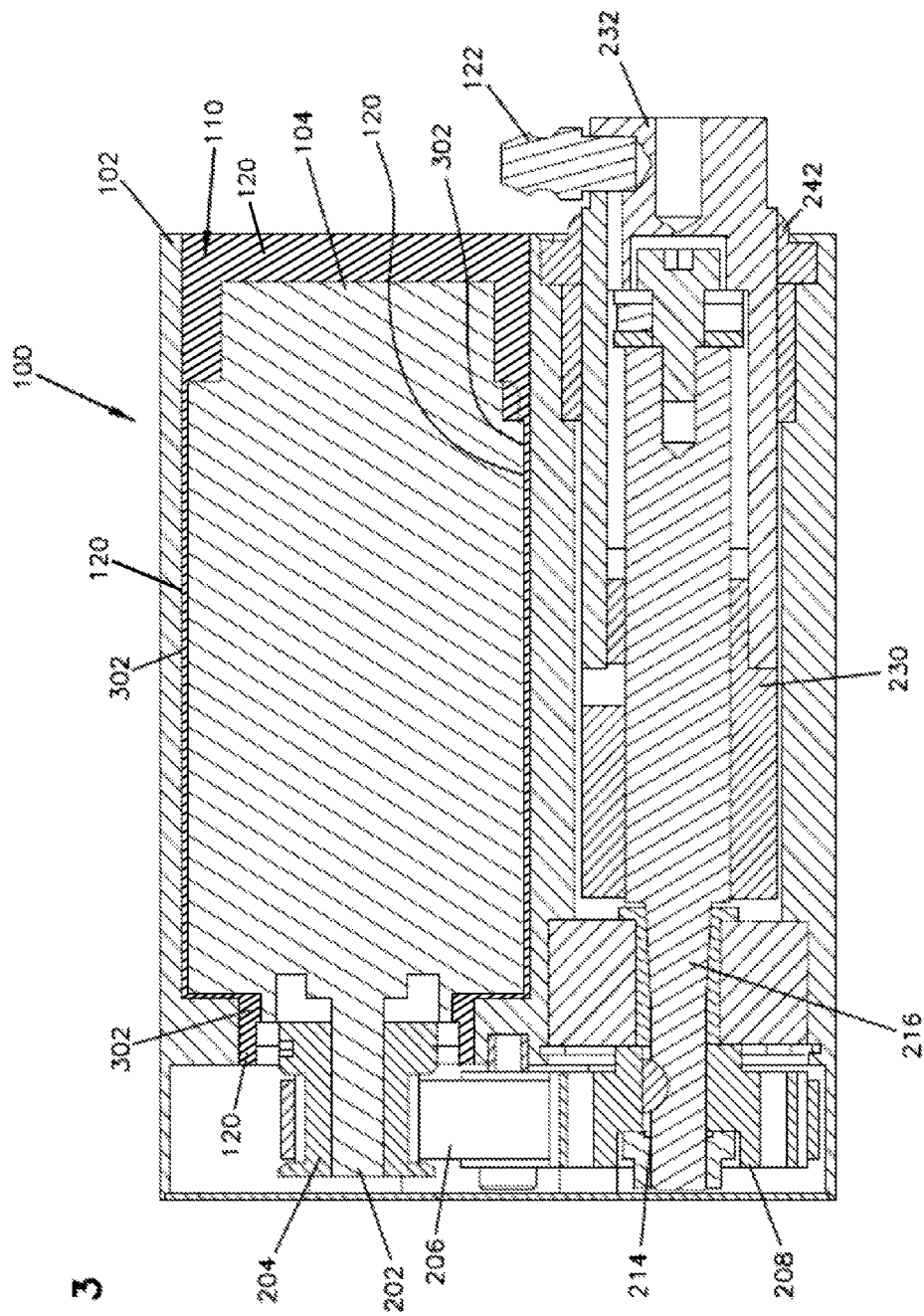
FIG. 3 is a cross-sectional view of the actuator and housing assembly according to another embodiment of the invention.

FIG. 3 illustrates a cross-sectional view of the fully assembled actuator and housing assembly 100, according to another embodiment of the invention. As shown, the assembled actuator and housing assembly 100 supports servo motor 104 within motor recess 110. Servo motor 104 is secured by servo motor screws 112. In operation, motor drive shaft 202 rotates drive pulley 204, which in turn rotates drive belt 206. Drive belt 206 then transfers rotational energy to screw shaft pulley 208, which is coupled to and rotates screw shaft 216 with additional frictional contact provided by key 214. The rotation of screw shaft 216 either pushes the nut 230 away from, or pulls the nut 230 towards the screw shaft 216 depending on the direction of rotation. Nut 230, which engages the thrust rod 230 in turn forces the thrust rod 230 out of or pulls the thrust rod 230 towards the screw shaft 216 in a linear fashion.

In certain embodiments, areas that may be at least partially filled with thermal grease 120 include are indicated at points numbered 302. Generally, the area between servo motor 104 and housing 102 are targets for thermal grease 120. According to some embodiments of the present invention, all areas 302 may be at least partially filled with thermal grease 120 to promote conduction of heat away from the actuator parts, as well as the servo motor 104, and towards the actuator housing 102 to dissipate all heat involved.

FIG. 4A illustrates a rear view of the actuator and housing assembly 100 according to an embodiment of the present invention. This perspective shows a rear view of actuator housing 102, rear housing cover 246, securing screws 248, and trunnions 106. The particular configuration shown in FIG. 4A represents a teardrop shape for the actuator housing 102, with vertical height dimension of 77.55+/−0.38 mm, length of 109.78 mm, a radius on the upper curved portion of the case of 22.50 mm, and a radius on the lower curved portion of 17.971 mm. In an alternative embodiment, the height may be 72.55+/−0.38 mm. The rounded edges of the housing are designed to facilitate insertion of the actuator and housing assembly 100 into tight spaces.

FIG. 4B shows a rear view of the actuator and housing assembly according to another embodiment of the present disclosure. This perspective also illustrates actuator housing 102, rear housing cover 246, securing screws 248, and trunnions 106. According to an embodiment of the present invention, the configuration has an oval shaped actuator housing 102 and can accommodate a servo motor 104 similarly to FIG. 4A by virtue of its shape. As in FIG. 4A, this configuration is also designed to assist insertion of actuator assembly and housing 100 into tight or specifically shaped spaces. In one embodiment, the shape of the housing is further designed to look like a muscle, as in the muscle of an animatronic character. In one embodiment, the dimensions for the actuator housing 102 are a vertical height dimension of 72.55+/−0.38 mm, length of 109.78 mm, a radius on the upper curved portion of the case of 22.50 mm, and a radius on the lower curved portion of 17.97 mm.

The actuator and housing assembly described above provides various advantages over traditional actuator and motor assemblies. Traditionally, due to heat and space constraints, many actuator assemblies isolated the motor from the actuator portion, both for space reasons as well as for heat dissipation purposes. Also, traditional uses abided by relatively low manufacturer-specified operating temperatures and current levels to prevent damage to the motor itself.

In order to improve upon the above problems, the increased heat dissipation of the present invention permits the servo motor to operate at a higher performance level. When the servo motor is introduced into the assembly according to the present invention, excess heat may be dissipated throughout the entire housing. In one embodiment, the increased heat dissipation permitted an approximate increase in performance of 1.82 times, or an 82% increase in performance over the manufacturer suggested operating limits. In other words 82% more current can be passed to the motor, thereby achieving approximately 82% more motor torque and subsequently 82% more actuator thrust, while remaining within safe operating temperature limits as established by the motor manufacturer. According to one embodiment, the actuator and housing assembly 100 yielded 8.475 watts of continuous power, and 250 pounds of force. A further advantage is that both the motor and actuator assemblies may be contained in one compact package, which may allow the entire assembly to fit into smaller envelopes for a wider variety of uses. This is as opposed to isolating the motor from the actuator assembly due to heat or other problems. Generally a higher power density is achievable according to some embodiments of the present invention. Moreover, the invention lends itself to scalability. A larger motor may be inserted in a larger housing together with an actuator assembly, and still dissipate heat efficiently, permitting higher motor torque and actuator thrust performance by allowing higher current at safer temperatures.

Although the various embodiments of the present disclosure have been described with reference to preferred embodiments, persons skilled in the art will realize that changes may be made in form and detail without departing from the spirit and scope of the present disclosure.

We claim:

1. A linear actuator and housing assembly, comprising:
an actuator housing;
an electric servo motor having a motor housing coupled to the actuator housing, wherein the electric servo motor is disposed within the actuator housing such that there is a close proximity between the actuator housing and the motor housing;
a linear actuator assembly operably coupled to the electric servo motor, wherein the linear actuator assembly is disposed within said actuator housing; and
a thermally conductive material disposed between said actuator housing and said electric servo motor, the thermally conductive material having high thermal conductivity to transfer heat from the electric servo motor and linear actuator assembly to the actuator housing for dissipation of the heat therefrom;
wherein the thermally conductive material fills all areas between the electric servo motor housing and the actuator housing including an area disposed around an outer peripheral surface of the motor housing and recess areas at a proximal end and a distal end of the motor housing to promote conduction of the heat away from the linear actuator assembly and the electric servo motor toward the actuator housing; and
wherein substantially no air is present between the electric servo motor housing and the actuator housing.

2. The linear actuator and housing assembly of claim 1, wherein the actuator housing comprises a lightweight metal.

3. The linear actuator and housing assembly of claim 2, wherein the actuator housing comprises aluminum.

4. The linear actuator and housing assembly of claim 1, wherein the electric servo motor is disposed within a motor recess within the actuator housing and operably coupled to the linear actuator assembly via a drive belt and pulley system disposed within the actuator housing.

5. The linear actuator and housing assembly of claim 4, wherein the linear actuator assembly is disposed within an actuator recess adjacent the motor recess within the actuator housing and secured to the actuator housing by a beveled snap ring.

6. The linear actuator and housing assembly of claim 1, wherein the actuator assembly comprises a screw-driven linear actuator having a rotating screw shaft in engagement with an actuator nut coupled to a thrust rod, the thrust rod having a fitting to supply lubrication to the actuator assembly.

7. A muscle of an animatronic character comprising the linear actuator and housing assembly of claim 1, wherein a design of the actuator housing defines a shape of the muscle.

8. The linear actuator and housing assembly of claim 1, wherein the actuator housing further comprises heat dissipation fins configured to increase the surface area of the actuator housing along which the heat is dissipated.

9. The linear actuator and housing assembly of claim 1, wherein the actuator housing has an oval profile to accommodate the electric servo motor adjacent the actuator assembly within the actuator housing.

10. The linear actuator and housing assembly of claim 1, wherein the actuator housing has a teardrop profile to accommodate the electric servo motor adjacent the actuator assembly within the actuator housing.

11. The linear actuator and housing assembly of claim 1, wherein the thermally conductive material comprises a thermal paste disposed between the electric servo motor and the actuator housing, including the motor recess area at the distal end of the actuator housing.

12. A linear actuator and housing assembly, comprising:
a metallic actuator housing coupled to an electric servo motor having a motor housing coupled to the metallic actuator housing and a linear actuator assembly, wherein the electric servo motor is operably coupled to the linear actuator assembly and the electric servo motor and the linear actuator assembly are adjacently disposed within the metallic actuator housing, the electric servo motor disposed within the actuator housing such that there is a close proximity between the actuator housing and the motor housing; and
a thermally conductive material disposed between the metallic actuator housing and the electric servo motor, the thermally conductive material having high thermal conductivity;
wherein the thermally conductive material fills all areas between the electric servo motor housing and the metallic actuator housing including an area disposed around an outer peripheral surface of the motor housing and recess areas at a proximal end and a distal end of the motor housing to transfer heat from the electric servo motor and linear actuator to the actuator housing for dissipation therefrom; and
wherein substantially no air is present between the electric servo motor and the actuator housing.

13. The linear actuator and housing assembly of claim 12, wherein the metallic actuator housing comprises aluminum.

14. The linear actuator and housing assembly of claim 12, wherein the metallic actuator housing has an oval shape to accommodate the electric servo motor and the linear actuator therein.

15. A method for dissipating heat in an electric servo motor powered linear actuator and housing assembly, the electric servo motor having a motor housing and the method comprising:
coupling the electric servo motor and linear actuator to a metallic actuator housing, such that the electric servo motor and the linear actuator are disposed within the metallic actuator housing with close proximity between the metallic actuator housing and the electric servo motor housing, the electric servo motor inserted into a motor recess area at a distal end of the metallic actuator housing;
providing a thermally conductive material between the metallic actuator housing and the electric servo motor, the thermally conductive material having high thermal conductivity to transfer heat from the electric servo motor and linear actuator to the actuator housing for dissipation therefrom; and
filling all areas between the electric servo motor housing and the metallic actuator housing including an area disposed around an outer peripheral surface of the motor housing and recess areas at a proximal end and the distal end of the motor housing with the thermally conductive material such that substantially no air is present between the electric servo motor housing and the actuator housing to conduct the heat produced by the electric servo motor powered linear actuator away from the linear actuator and electric servo motor into the metallic actuator housing for dissipation therefrom.

16. The method for dissipating heat in the electric motor powered linear actuator and housing assembly of claim 15, wherein the thermally conductive material is coated on the outside of the electric servo motor before insertion into the metallic actuator housing.

17. The method of claim 15, further comprising circulating a cooling fluid over the metallic actuator housing.

18. The method of claim 15, wherein the thermally conductive material comprises thermal grease, and further comprising injecting the thermal grease into the motor recess area at the distal end of the metallic actuator housing after insertion of the electro servo motor therein.

\* \* \* \* \*